(12) United States Patent
Lehmann et al.

(10) Patent No.: US 8,604,807 B2
(45) Date of Patent: Dec. 10, 2013

(54) METHOD FOR THE OPERATIVE MONITORING OF TRACK BRAKES

(75) Inventors: Henry Lehmann, Hinterbrühl (AT); Josef Datzreiter, Kottingbrunn (AT); Franz Daxecker, Vienna (AT); Peter Schlager, Kirchberg (AT)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 418 days.

(21) Appl. No.: 12/996,893

(22) PCT Filed: Jun. 10, 2009

(86) PCT No.: PCT/EP2009/004162
§ 371 (c)(1),
(2), (4) Date: Jan. 20, 2011

(87) PCT Pub. No.: WO2009/152983
PCT Pub. Date: Dec. 23, 2009

(65) Prior Publication Data
US 2011/0109326 A1    May 12, 2011

(30) Foreign Application Priority Data
Jun. 20, 2008 (DE) .......................... 10 2008 029 312

(51) Int. Cl.
*G01R 27/28* (2006.01)
*B61K 7/02* (2006.01)
*B61H 13/00* (2006.01)

(52) U.S. Cl.
USPC ............................. 324/656; 104/26.2; 188/33

(58) Field of Classification Search
None
See application file for complete search history.

(56) References Cited

U.S. PATENT DOCUMENTS 6,774,595 B1 * 8/2004 Laxhuber et al. ............. 318/565
8,185,287 B2 * 5/2012 Maron et al. .................... 701/70

FOREIGN PATENT DOCUMENTS

DE  1 183 117   12/1964
DE  100 09 331   9/2001
(Continued)

OTHER PUBLICATIONS

Ryoo, et al., Design and Analysis of an Eddy Current Brake for a High-speed Railway Train with Constant Torque Control, Conference Record of the 2000 IEEE Industry Applications Conference, vol. 1, pp. 277-281, 2000.*
Transmittal of International Preliminary Report on Patentability for International Application No. PCT/EP2009/004162 and Written Opinion.

(Continued)

*Primary Examiner* — Melissa Koval
*Assistant Examiner* — Daniel Miller
(74) *Attorney, Agent, or Firm* — Barnes & Thornburg LLP

(57) ABSTRACT

Operative monitoring of track brakes involves passing an electric current through a winding of a brake magnet, measuring the electric current and comparing the temporal progression of the measured current with a saved temporal progression of a reference current. Comparison is achieved by calculating the difference between the measured current and the reference current. The difference between measured current and reference current may be temporally integrated and compared with a threshold value. To determine a magnetic coupling between track brake and track, a calculation may be made as to whether the measured current has local minima and/or local maxima during the activation of the track brake, only the temporal progression of the measured current as the current increases being subjected to a comparison with the reference current. The current may be activated in pulses, with the comparison of the measured current and the reference current being restarted with each pulse.

20 Claims, 4 Drawing Sheets

(56) References Cited

FOREIGN PATENT DOCUMENTS

| | | |
|---|---|---|
| DE | 101 55 143 | 5/2003 |
| DE | 101 55 143 A1 | 5/2003 |
| DE | 10 2008 029 312 | 12/2009 |
| EP | 1 177 962 | 2/2002 |
| JP | 8-237808 | 9/1996 |
| JP | 2005030531 A * | 2/2005 |
| JP | 2008168981 A * | 7/2008 |
| WO | WO 2009024168 A1 * | 2/2009 |

OTHER PUBLICATIONS

English Translation of the International Preliminary Report on Patentability for International Application No. No. PCT/EP2009/004162 and Written Opinion.
Wolfgang Hendrichs, "Das Statische, Dynamische und Thermische Verhalten Von Magnetschienenbremsen", 1988, pp. 224-228.
International Search Report for International Application No. PCT/EP2009/004162, dated Jun. 1, 2009.
English Translation of International Search Report for International Application No. PCT/EP2009/004162, dated Jun. 1, 2009.

* cited by examiner

METHOD FOR THE OPERATIVE MONITORING OF TRACK BRAKES

CROSS-REFERENCE TO RELATED APPLICATIONS

The present application claims the benefit of priority to International Patent Application No. PCT/EP2009/004162 filed 10 Jun. 2009, which further claims the benefit of priority to German Patent Application No. 10 2008 029 31.1 filed 20 Jun. 2008, the contents of which are incorporated herein by reference in their entirety.

BACKGROUND

The disclosed embodiments relate to a method for the operative monitoring of track brakes for rail vehicles. Such a method is known from DE 101 55 143 A1.

Modern rail vehicles are usually equipped, in addition to a pneumatic brake system, with a magnetic track brake which is embodied as an eddy current brake or magnetic track brake.

In solid tracks, "suspension" is customary in which a brake magnet is held above the rails at a predetermined height of approximately 100 mm by springs. For the braking process, the spring forces are overcome by pneumatic activation cylinders, and the brake magnets are lowered onto the rail, into the work position, from the elevated position. At the same time, the brake is switched on electrically (cf. Wolfgang Hendrichs, "Das statische, dynamische and thermische Verhalten von Magnetschienenbremsen [The static, dynamic and thermal behavior of magnetic track brakes]", Elektrische Bahnen [Electric Railways], eb, 86th year, issue July 1988, pp. 224-228).

In traction vehicles, it is also possible to provide a combination of elevated suspension and low suspension. The magnets are then suspended from pressure cylinders or air bellows which are pressed by means of compressed air into the elevated position against a centering stop which is fixed to the truck. When the brakes are activated, the pressure cylinders or air bellows are then are vented, the magnets being lowered into the standby position. In urban network vehicles such as, for example, trams, low suspension is customary. When a magnetic track brake is in the braking position, the brake magnet is generally in frictional contact with the rail.

In contrast, it is also the case that, in what is referred to as a linear eddy current brake, the brake magnet is held at a distance from the rail, electric solenoids magnetizing pole cores so that when an eddy current brake is switched on (and there is a relative movement of the eddy current brake with respect to the rail owing to the changes in the magnetic flux over time), eddy currents are induced in the travel rail. These eddy currents generate a secondary magnetic field which is opposed to the magnetic field of the eddy current brake. This results in a horizontal braking force which acts in opposition to the direction of travel. However, this requires there to be magnetic coupling between the rail and the brake magnet which depends essentially on the air gap between the brake magnet and the rail.

In both types of magnet brakes, the effectiveness of the brake is essentially on the respectively correct distance between the brake magnet and rail.

DE 101 55 143, therefore, proposes a diagnostic and monitoring device for monitoring the distance between the magnetic brake and the travel rail which uses a plurality of distance sensors which measure the air gap between the magnetic brake and the upper side of the rail. As a result, in both types of magnetic brakes it is possible to continuously check both whether the brake magnet is in the travel position and whether it is at the correct distance from the rail in the braking position.

However, the sensors require additional expenditure and there is the risk that, in the event of failure or malfunction of the sensors, faults are not detected or inappropriate fault signals are generated.

DE 100 09 331 C2 also proposes the use of sensors which measure the distance between the magnetic brake and the upper edge of the rail and, as a function of the measurement signal, open-loop/closed-loop control device which adjust the distance between the magnetic brake and the upper edge of the rail using actuators.

SUMMARY

The object of the disclosed embodiments is to improve the method for the operative monitoring of track brakes of the type mentioned at the beginning with the effect that satisfactory functioning of the track brake can be checked without using distance sensors. This object is achieved by means of the features specified in patent claims.

The disclosed embodiments are based on the basic idea that changes in current which are brought about by changes in the magnetic circuit permit an unambiguous conclusion to be drawn about the state assumed by the track brake/rail system.

The magnetic coupling between the brake magnets and the rail forms a magnetic circuit and in the case of a magnetic track brake it is dependent on the distance between the brake magnet and the rail. The magnetic coupling, therefore, has an immediate reactive effect on the exciter current which flows through the winding of the brake magnet. If the exciter current is switched on during the lowering of the magnetic track brake, a significant change in the exciter current is obtained as soon as the magnetic coupling takes place.

The disclosed embodiments, therefore, propose measuring the electric current through the winding of the brake magnet and comparing the time profile of the measured current with a stored time profile of a reference current. This makes available a signal which indicates whether a magnetic coupling has taken place between the brake magnet and the rail, which may be equivalent to the effectiveness or availability of the track brake.

In an analogous fashion this also may apply to magnetic eddy current brakes in which the time profile of the exciter current depends on the magnetic coupling between the brake magnet and the rail.

The changing of the magnetic coupling between the brake magnet and the rail may be detected by comparing the expected current profile (reference current) with a measured current profile.

There is, therefore, no need for additional sensors or for the previously applied visual inspection. The measurement of the exciter current does not require any additional sensors but rather merely a measuring resistor in a control device. The evaluation of the time profile of the exciter current and the comparison with an expected current profile can be performed by a microprocessor in a brake control device. This makes it possible to determine the availability of the track brake or the braking effectiveness thereof.

BRIEF DESCRIPTION OF THE FIGURES

The disclosed embodiments will be explained in more detail below with reference to the drawing, in which.

DETAILED DESCRIPTION

Figure 1:
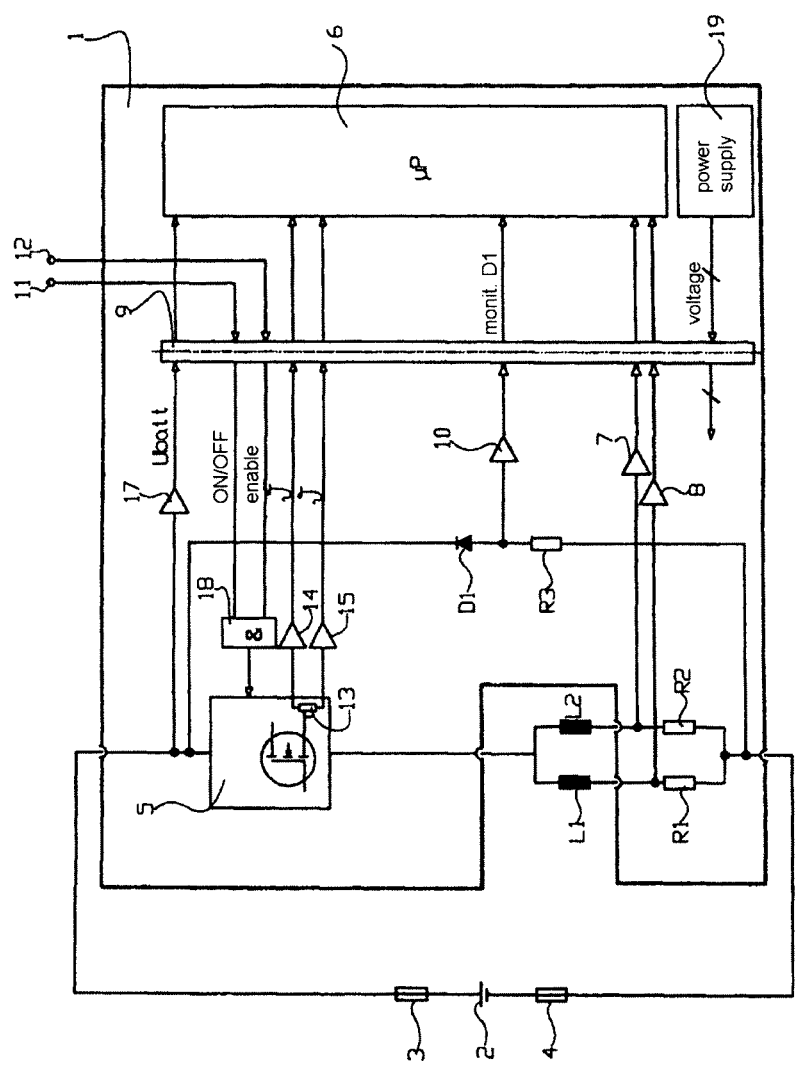
FIG. 1 shows a basic circuit diagram of a control device for actuating a magnetic track brake.

FIG. 1 shows a control device 1 for the actuation of brake magnets which are illustrated in the diagram in FIG. 1 as inductors L1 and L2. This control device 1 is supplied with electrical energy from an on-board power system such as, for example, a battery 2, and is protected with respect to both poles of the battery by a fuse 3 and 4, respectively.

The two inductors L1 and L2 are located in a circuit with a power switch 5 which is actuated by a microprocessor 6 and which connects inductors L1 and L2 to the battery voltage of the battery 2. The two inductors L1 and L2 are each in a series connection to shunt resistors R1 and R2, respectively, the voltage drop of which is proportional to the current flowing through the inductors L1 and L2, respectively. This voltage is tapped at the common connecting point between the inductors L1 and L2 and the shunt resistors R1 and R2 and is transmitted via measuring amplifiers 7 and 8, respectively, to the microprocessor 6. The microprocessor 6 is separated from the power component of the circuit by a galvanic isolating means 9.

The power switch 5 has a temperature sensor 13 which measures the temperature of the power switch 5 and signals said temperature to the microprocessor 6 via measuring amplifiers 14 and 15 across the galvanic isolating means 9.

A free-wheeling diode D1, which is assigned a shunt resistor R3, and a measuring amplifier 10, which transmits the diode-monitoring signal to the microprocessor 6 across the galvanic isolating means 9, lying parallel with the series circuit composed of the power switch 5, inductors L1, L2 and shunt resistors R1 and R2.

A pole of the power switch 5, which is connected to the battery voltage (normally the positive pole) is connected to the microprocessor 6 via a further measuring amplifier 17 across the galvanic separating means 9. The battery voltage can be measured and monitored in this way.

The power switch 5 is switched by two signal, specifically an enable signal and a switching signal (ON/OFF) for switching the power switch 5 on and off. The two signals can be fed via external connections 11 and 12 to the control device 1, specifically also in an expedient way via the galvanic isolating means 9, wherein it is, of course, also possible to feed these signals to the microprocessor 6 which passes them onto its outputs via the galvanic isolating means. These two signals are logically linked to one another in an "AND" gate 18 and they control the power switch 5 and therefore the switching on and off of the inductors L1 and L2 for the brake magnets.

On the side which is galvanically isolated from the power component (in particular power switch 5), there is, in addition to the microprocessor 6, also a power supply component 19 which makes available a regulated voltage supply for the measuring amplifiers and for the actuation of the power switch 5. The voltage supply of the specified components is also separated galvanically from the power supply component 19.

The current through the inductors L1 and L2 is continuously measured by the shunt resistors R1 and R2 and signaled to the microprocessor 6.

The free-wheeling diode D1 is monitored by the measuring amplifier 10, which is embodied as a comparator, and which measures a current through the free-wheeling diode D1 as a voltage drop at the shunt resistor R3. The measuring amplifier 10 therefore transmits a digital signal to the microprocessor 6.

The temperature of the power switch is monitored by the temperature sensor 13 and is signaled as an analog signal from the measuring amplifiers 14 and 15 to the microprocessor 6. The battery voltage is also monitored by the measuring amplifier 17 and is signaled as an analog signal to the microprocessor 6. All the signals from and to the power component and all the supply voltages of the power component are galvanically isolated from the control component (microprocessor 6 and power supply component 19).

The temperature of the brake magnets is monitored indirectly by means of the current through the inductors L1 and L2 in the steady state. The ohmic resistance of the of the inductors L1 and L2 changes significantly with the temperature so that given otherwise known parameters in the steady state and a constant current greater than 0 and a time derivative $di/dt=0$, the current permits conclusions to be drawn about the temperature of the brake magnets, and this is taken into account in the evaluation.

Figure 2:
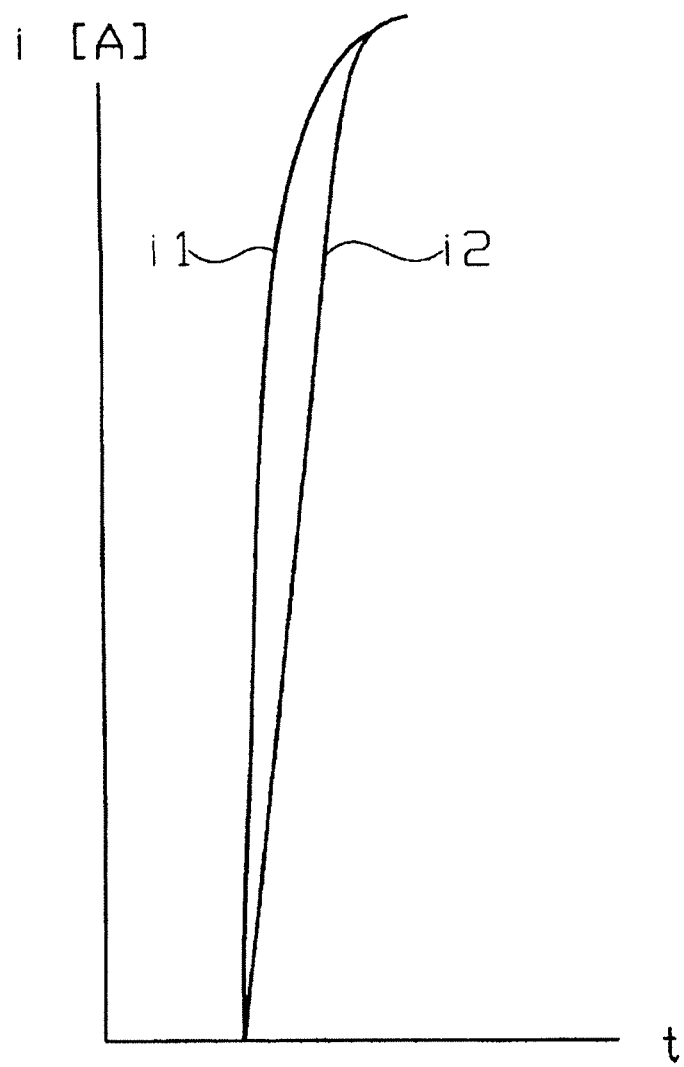
FIG. 2 shows a measurement diagram of the time profile of the exciter current, for the cases of effective magnetic coupling and ineffective magnetic coupling between the brake magnet and the rail.

FIG. 2 shows a diagram of the current (i) which flows through the inductors (brake magnet) L1 and L2, as a function of the time (t). The current profile i1 shows the case in which the brake magnet is in contact with the rail, while the current profile i2 shows the case in which the brake magnet is not in contact with the rail. The two current profiles i1 and i2 differ significantly with respect to the rate of increase of the current. According to the basic concept of the invention, the rates of increase of the current are evaluated. It is therefore possible to determine whether the brake magnet is in contact with the rails solely by measuring the current across the shunt resistors R1 and R2 (FIG. 1).

According to one variant of the invention, the time profile of the increase in current with contact between the brake magnet and the rail according to curve i2 in FIG. 2 is stored in the microprocessor 6 as a "reference current". This curve I2 of the reference current can, according to a first variant of the invention, be determined individually for the individual track brake. According to another variant of the invention, it is also possible to define the curve I2 for the reference current in a purely computational or theoretical fashion and to adapt it to the respective type of track brake or to the individual track brake through suitable standardization factors or by selecting threshold values which are explained below.

The microprocessor 6 continuously forms the difference between the measured current profile, which is signaled via the shunt resistors R1 and R2 and the measuring amplifiers 7 and 8, and the current profile of the reference current value, and it integrates the difference over time. If this integral of the difference of the current profiles exceeds a predetermined threshold value, the microprocessor 6 signals that there is no contact between the brake magnet and the track. If, conversely, this integral is below the threshold value, the microprocessor signals that there is contact and therefore the track brake is available and effective. However, conversely it is also possible to relate the curve I2 for the reference current to a track brake which has not been applied and then to operate with inverse logic compared to the previously described case.

The specified integral of the difference is preferably evaluated only in a predefined time interval which is shorter than the time period within which the current through the inductors L1 and L2 has reached its full saturation value or rated value.

Figure 3:
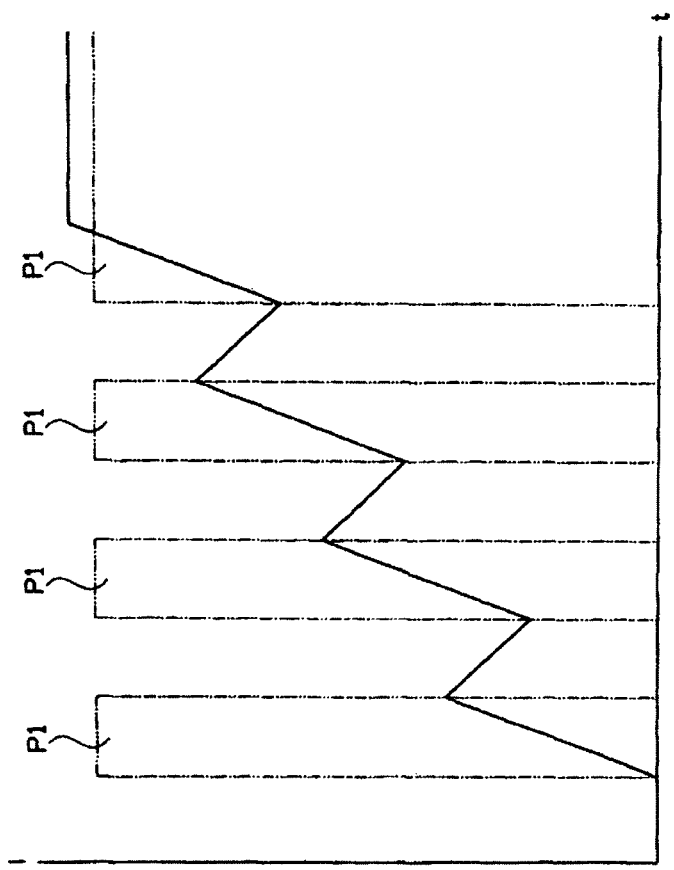
FIG. 3 shows a diagram of the time profile of the exciter current when the exciter current is switched on in a clocked fashion.

According to one implementation, which is illustrated purely schematically in FIG. 3, the switch-on process is divided along a plurality of switch-on pulses P1 to P4, i.e. the power switch 5 in FIG. 1 is clocked. This results in successive increases and drops in current until the full rated current is reached in phase P4. The previously described evaluation of the rates of increase in the current is carried out anew in each of the phases P1 to P4, wherein this evaluation can also be carried out in a time interval which is shorter than phases P1, P2 or P3. The evaluation is preferably performed at the start of the respective phase.

Figure 4:
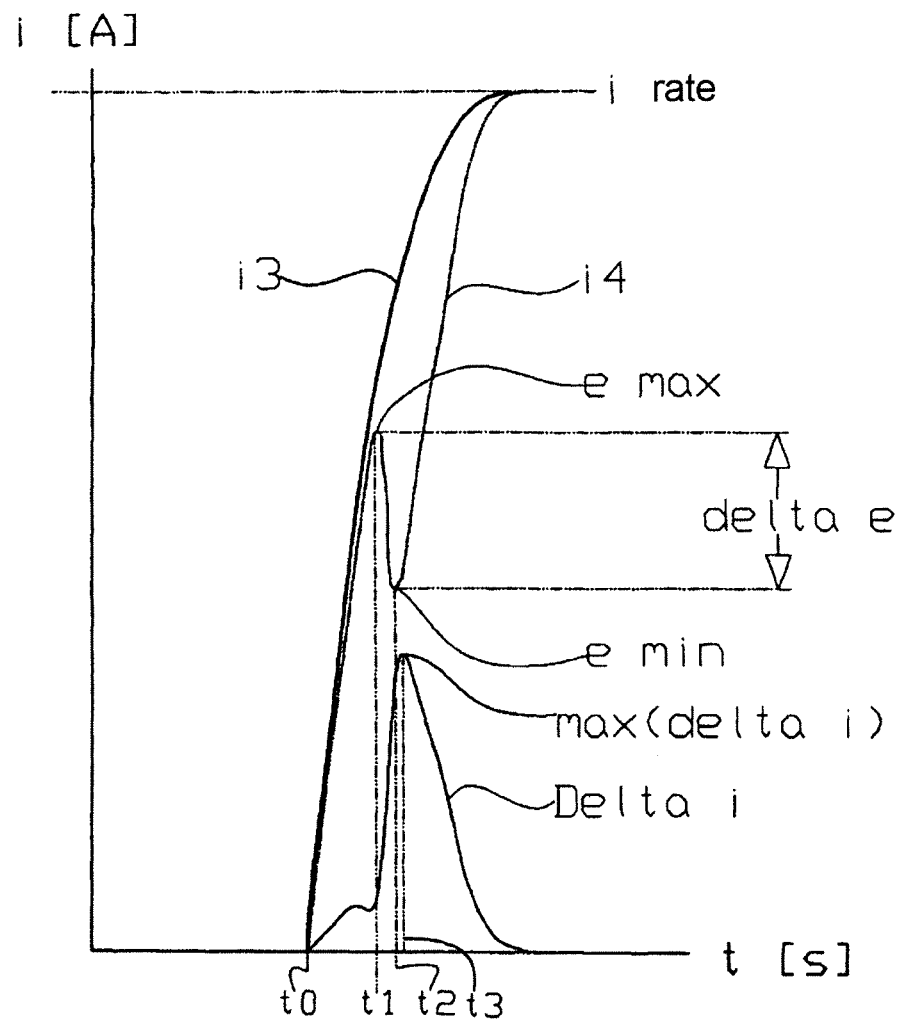
FIG. 4 shows a measurement diagram of the time profile of the exciter current with and without change in the magnetic coupling between the brake magnet and the track.

FIG. 4 shows current profiles of the current through the inductors L1 and L2 as a function of the time. The curve i3 shows a current profile of the switch-on current without a change in state of the magnetic coupling between the brake magnet and the rail. Depending on whether the magnetic coupling is present or not, the steepness according to curves i1 and i2 in FIG. 2 is different. If a change in state of the magnetic coupling between the brake magnet and the rail takes place during the switch-on process, the current profile according to curve i4 shows a significant change to the formation of local extreme values e min and e max. The moment (t1) at which the magnetic coupling occurs, the value of the inductors L1 and L2 changes in the equivalent circuit diagram in FIG. 1 so that the current reaches a local maximum value (e max) and then becomes smaller for a brief time and is renewed after reaching a local minimum e min at the time t2, and then increases somewhat more slowly. By evaluating the significant changes, in particular the local extreme values e max and e min in the current i4, it is therefore possible to detect a change in state of the magnetic coupling. If, for example as illustrated in FIG. 4, the exciter current i4 for the inductors L1 and L2 is already switched on during the phase of the mechanical lowering of the brake magnet in the direction of the rail, the magnetic coupling is formed starting from a certain distance when the air gap between the brake magnet and the rail is reduced, and the current profile according to curve i4 in FIG. 4 is measured.

According to one implementation, the evaluation according to the above method steps is respectively carried out anew after a local minimum e min has occurred. The rate of increase of the current is then therefore evaluated again starting from this time by integrating over time the difference between the stored setpoint curve (reference current) and the measured actual curve, wherein the evaluation can also be carried out in a predefined time window here. Only the positive rates of increase in the current are therefore compared.

The abovementioned threshold value of the integral can be set as a function of the type of the track brake.

Since in practice the measured current profiles and interference signals are superimposed, according to one development of the invention the signal of the measured current profile is filtered, specifically preferably with a low-pass filter whose limiting frequency is dependent on the type of track brake. The limiting frequency is of the order of magnitude of less than 50 Hz.

An increase in the reliability of the detection of local extreme values is obtained by virtue of the fact that the difference between the integrals of the current values of the local extreme values corresponds to at least 30% of the difference between the integrals of the stored reference current, wherein the two integrals are each determined in the same time period.

In order to detect the magnetic coupling between the brake magnet and the rail it is also possible to sense the time interval (t2−t1) between the local extreme values and compare it to those of a standard signal. The time difference t1−t2 within which the current profile varies between the local maximum e max and the local minimum e min is therefore evaluated. In this context, preferably only current profiles in which the difference Delta e between the local maximum e max and the local minimum e min exceeds a predefined limiting value are evaluated.

In this context it is also possible in turn to determine the integral of the difference between the measured current profile and a stored reference current profile.

The integral of the difference between the actual current profile and such a reference current profile, which is formed starting from the time of the first extreme value (e max in FIG. 4) by means of an extrapolated part of a curve up to the point when the rated current I rate is reached, can also be formed. A threshold value which is dependent on the type of track brake can then also be formed again here. A magnetic coupling between the brake magnet and rail is only assumed to be present if this threshold value is exceeded. This evaluation of the extrapolated part of the curve can also be limited to a time window, in which case a threshold value which is dependent on the type of track brake then also has to be exceeded again.

A further criterion may be that the current in the local minimum e min within a time window t2−x to t2+x exceeds a mean value of the current in this time window. The time period x depends on the type of track brake and is of the order of magnitude of less 1 second.

A further criterion can be determined as follows. The difference Delta i between the measured current i4 and the reference current i3 is formed continuously, and this is illustrated in the curve Delta i in FIG. 4. The time t3 of the maximum of the Delta i is determined from the profile of Delta i, and it is checked whether this is within a time period t2−x to t2+x. If this is the case, this is also a criterion for the fact that the magnetic coupling between the brake magnet and the track has taken place. The measurement diagram in FIG. 4 shows that the maximum value of the difference max (Delta i), can also lie outside the time range t1 to t2, for which reason it is appropriate to position said time window on both sides of t2. Instead of the difference it is also possible to determine and evaluate the integral of the difference and the maximum value thereof.

Finally, faults can be eliminated on the basis of fluctuations in the battery voltage, a change in the temperature of the solenoids of the track brake and/or the temperature of the power switch 5 by virtue of the fact that the store setpoint curve of the reference current is standardized with respect to the battery voltage, the temperature of the solenoids of the track brake and/or the temperature of the power switch 5. The battery voltage and the temperature of the power switch 5 are sensed, according to FIG. 1, by the measuring amplifier 17 for the battery voltage, and the measuring amplifiers 14 and 15 for the temperature of the power switch. The temperature of the solenoids of the track brakes is, as explained above, determined indirectly by measuring the steady-state current through the inductors L1 and L2. A steady-state current is defined by virtue of the fact that the current is greater than 0 and the derivative of the current di/dt over time is equal to 0.

The invention claimed is:
1. A method for the operative monitoring of track brakes, in which an electric current passes through a winding of a brake magnet, the method comprising:
    measuring the electric current (i2, i4);
    comparing a time profile of the measured current with a stored time profile of a reference current (i1, i3); and wherein local minimum values (e min) and/or local maximum values (e max) of the measured current (i4) are determined, and wherein only the time profile of the measured current (i4) with an increase in the current (i4) is subjected to comparison with the reference current (i3).

2. The method of claim 1, wherein the comparison is carried out by forming differences between the measured current (i2, i4) and the reference current (i1, i3).

3. The method of claim 1, wherein a difference between the measured current (i2, i4) and the reference current (i1, i3) is integrated over time.

4. The method of claim 1, wherein the comparison is carried out only within a predefined time interval during a switch-on process of the track brake, wherein the predefined time interval is shorter than a time period between a switching on of the electric current and a point when a rated current is reached.

5. The method of claim 1, wherein the electric current fed to the winding of the brake magnet is fed in pulses (P1-P4), and wherein the comparison is carried out anew at every pulse (P1-P4).

6. The method of claim 1, wherein only the profile of the measured current (i4) which follows a local minimum (e min) is subjected to the comparison with the reference current (i3).

7. The method of claim 1, wherein when local minimum values (e min) and local maximum values (e max) of the measured current (i4) are detected, the time integral of the difference between the rate of change of the measured current (i4) and that of the reference current (i3) during a predefined time period is determined and compared with a predefined threshold value.

8. The method of claim 1, wherein the stored time profile of the reference current (i1, i3) is determined as a function of the type of the track brake.

9. The method of claim 1, wherein the comparison of the time profile of the measured current with the time profile of the reference current is carried out as a function of at least one threshold value which is defined as a function of the type of the track brake.

10. The method of claim 1, wherein a time interval (t1−t2) between an occurrence of a local maximum value (e max) and that of a local minimum value (e min) is compared with corresponding values of a reference signal.

11. The method of claim 1, wherein the measured current (i2, i4) is filtered before the comparison with a low-pass filter.

12. The method of claim 11, wherein a limiting frequency of the low-pass filter is less than 50 Hz.

13. The method of claim 1, wherein the difference of current values between a local maximum value (e max) and a local minimum value (e min) is determined and compared with a predefined threshold value.

14. The method of claim 13, wherein the threshold value corresponds to at least 30% of a difference from the reference current.

15. The method of claim 1, wherein an integral of a difference between the measured current (i2, i4) and a part of a curve which is extrapolated from a time of the first extreme value (e max) up a point when a rated current (e rate) is reached is compared with a threshold value.

16. The method of claim 15 wherein a difference from the integral is formed within a predefined time window.

17. The method of claim 16, wherein the time window covers a region before (t2−x) and after (t2+x) the local minimum value (e min).

18. The method of claim 17, wherein the current which is measured at a time (t2) of the local minimum value (e min) is compared with a mean value of the current which is measured in the time window.

19. The method of claim 1, wherein it is checked whether a time of occurrence of a maximum value (max(Delta i)) of a difference (Delta i) between the actual current (i4) and the reference current (i3) lies within a predefined time window (t2−x to t2+x) where x is less than or equal to 1 second.

20. The method of claim 1, wherein a measured value of the current (i4) and/or the profile of the reference current (i3) is standardized as a function of size of the measured electric current (i4) in the steady state thereof.

* * * * *